J. R. MacMILLAN.
OXIDIZING APPARATUS.
APPLICATION FILED DEC. 20, 1918.

1,333,327.

Patented Mar. 9, 1920.
2 SHEETS—SHEET 1.

Witness
Chas. L. Grieshauer
H. Schoenthal.

Inventor
J. R. MacMillan,
By K. P. McElroy
Attorney

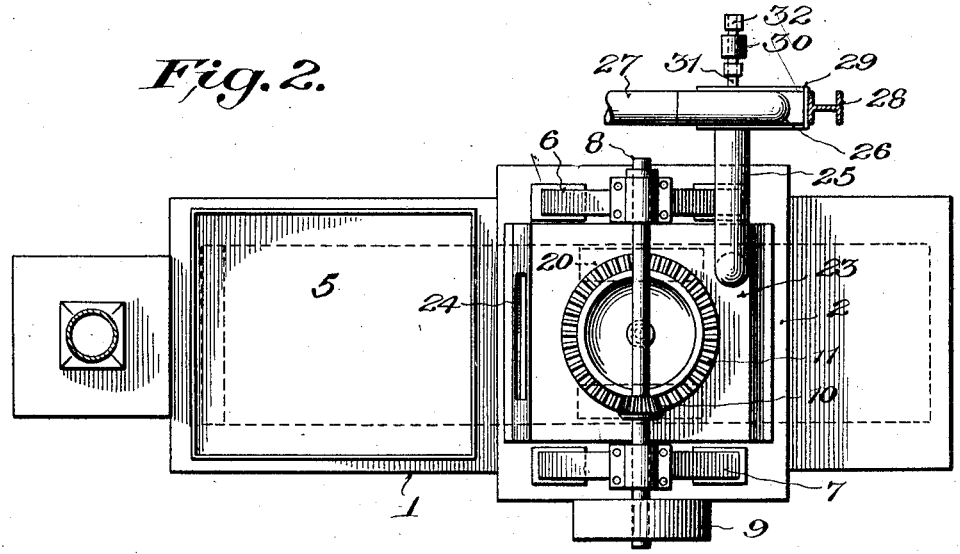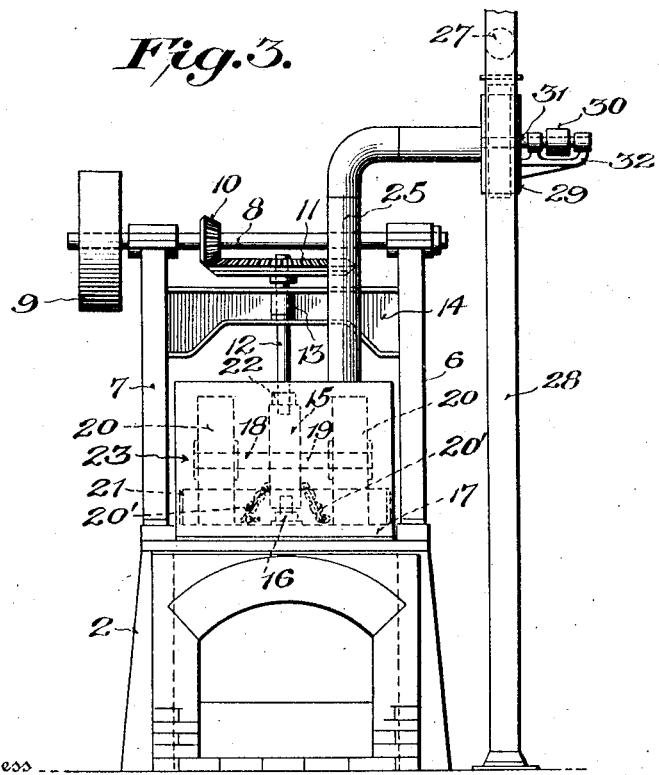

UNITED STATES PATENT OFFICE.

JOHN R. MacMILLAN, OF NIAGARA FALLS, NEW YORK, ASSIGNOR TO NIAGARA ALKALI COMPANY, OF NIAGARA FALLS, NEW YORK, A CORPORATION OF NEW YORK.

OXIDIZING APPARATUS.

1,333,327. Specification of Letters Patent. Patented Mar. 9, 1920.

Application filed December 20, 1918. Serial No. 267,671.

*To all whom it may concern:*

Be it known that I, JOHN R. MACMILLAN, a citizen of the United States, residing at Niagara Falls, in the county of Niagara and State of New York, have invented certain new and useful Improvements in Oxidizing Apparatus, of which the following is a specification.

This invention relates to oxidizing apparatus; and it comprises means for simultaneously heating, rabbling, aerating and grinding chemical materials susceptible of oxidation at high temperatures with formation of solid products of oxidation, such means including a mill of the general type of a chaser mill or arrastra having a grinding element traversing a comparatively large grinding plate or basin, such plate or basin being provided with means for heating it, and also having means permitting free access of air or other gas to material supported on said plate or basin and exposed to the comminuting action of the traversing grinding element; all as more fully hereinafter set forth and as claimed.

In many chemical arts it is desirable to perform oxidations with air at rather high temperatures and in all such cases it is desirable that contact with air be as intimate as possible. In some cases the materials are simply fused and air blown; but in many more this is impracticable. In making red lead, for example, the lead is first oxidized to make unfused PbO, or "massicot" and then the oxid is further oxidized to red lead with careful avoidance of temperatures high enough to sinter or melt. Melted oxid of lead, or litharge, is not readily oxidized. At times, further oxidation after fusion is inconvenient, laborious and expensive, as in making sodium manganate (manganate of soda) from a mixture of caustic soda and manganese dioxid. Such a mixture at a high temperature becomes sticky and dense and to produce rapid oxidation, careful rabbling is necessary.

In the present invention I have devised an apparatus capable of both rabbling and of enabling me to secure a maximum exposure of solid materials to air at any desired, regulated temperature and useful not only in the described oxidations but in many others. It is for instance useful in manufacturing calcium chromate (chromate of lime) from a mixture of lime and chrome ironstone; or sodium chromate from a mixture of chrome ironstone with caustic soda or sodium carbonate. All these mixtures tend to form sticky masses.

In this invention I provide an apparatus having a pair of grinding surfaces, one such surface being a plate or basin acting also as a hearth while the other is mounted to traverse the plate or basin and provide means for heating one or both elements and for permitting free access of air or other gas to the two surfaces. By regulating the heat of the grinding surface the solid material to be oxidized can be comminuted, exposing fresh surfaces while hot and in the presence of air without danger of fusion or sintering. In any oxidation of this sort, considering any individual particle the rapidity of oxidation diminishes in some geometric ratio with the distance from the actual aerated surface of any portion of the particle. Or in other words penetration of oxygen beyond the actual surface is very slow. But by comminuting and breaking up or rabbling the materials while hot the surface is constantly renewed and oxidation becomes very rapid even at temperatures at which oxidation of the material otherwise would be very slow. The apparatus is particularly convenient in handling such mixtures as those employed in making manganate of soda; and I have elsewhere described and claimed (see application Serial No. 239,493, filed June 11, 1918) a process involving the present principles for this purpose. Caustic soda at low temperature is deliquescent while at high temperatures it fuses; but with the present apparatus a mixture of caustic soda and manganese dioxid may be kept at an intermediate temperature where the soda is and remains solid without fear of the mass gumming or sticking either by absorbing moisture or by sintering or fusing. The two materials, the soda and the dioxid as solids may be caused to react together with the oxygen, the constant comminution bringing the particles into the actual contact required for this purpose. In making red lead, ordinary lead may first be oxidized to massicot in the apparatus, with the result of producing a very finely divided lead oxid. The production of red lead ordinarily begins before the oxidation of lead to massicot is complete; and the two reactions go on more or less contemporaneously.

In the accompanying drawings showing one form of apparatus within the purview of my invention;

Fig. 2 is a top plan view, and

Fig. 3 is an elevation taken at the right of Fig. 1.

Figure 1:
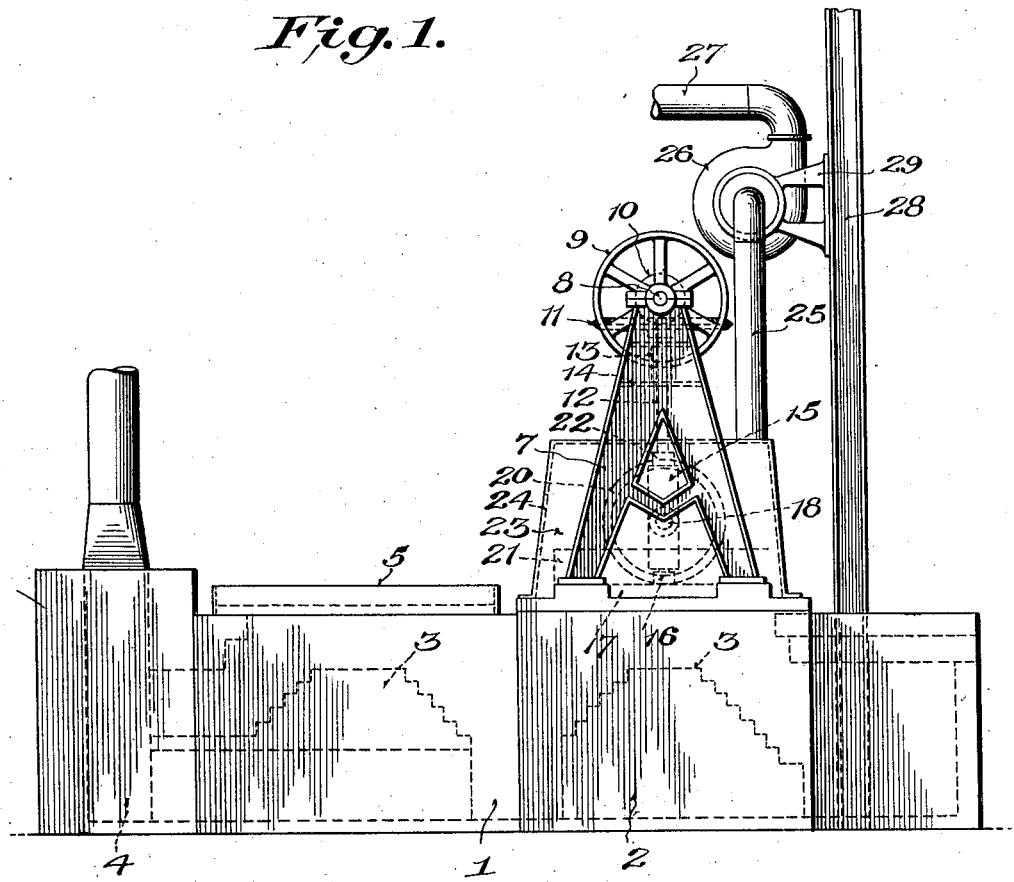
Figure 1 is a side elevation.

In the drawings, the furnace consists of two heating chambers, 1 and 2, each provided with converging walls of refractory material 3, serving to direct the heat and flames toward the top of the chambers. Stack 4 in communication with chamber 1 serves to produce the necessary draft and remove the waste gases. The furnace chambers may be fired by means of firing means of any usual construction. A mixture of a suitable material susceptible of oxidation is preheated or dried on the plate 5 over heating chamber 1 and is delivered thence into a chaser mill mounted over chamber 2. The mill as shown comprises standards 6 and 7 having a shaft 8 journaled therein with pulley wheel 9 keyed to the shaft. Driving pinion 10 attached to the shaft serves to drive the beveled gear 11 which in turn is keyed to shaft 12 having a bearing at 13 supported by a cross beam 14 connecting the two standards. Shaft 12 operates an enlarged extension 15 seated in the bearing 16 on the plate 17. This plate forms one of the grinding elements and is mounted over the top of the chamber 2. This extension 15 is bored at 18 to receive the horizontal shaft 19 carrying at either end roller elements 20 adapted to bear directly upon the plate 17. It may also carry stirring elements shown as chains 20' pivoted thereto, for turning and stirring the mass and pushing it into the path of the grinding rolls. Above this plate are upwardly extending walls 21 to confine the material. The rollers 20 may be adjusted with respect to the grinding plate by means of the nut 22 on shaft 12. The mill is advantageously inclosed by a hood 23, which has an opening 24 at one side in proximity to plate 5 of the heating chamber 1. This opening serves for the introduction of the predried mixture and for supplying air. In communication with the hood is a flue 25 leading to an exhaust fan 26. The amount of air passed over the material may be regulated by regulating the speed of this fan. Any dust resulting from the grinding operation goes forward to the exhaust means and may be recovered by any suitable means (not shown). Exit gases are sent away to waste or to a place of disposition through exhaust flue 27. The fan is mounted above the mill upon a standard or support which advantageously is as shown an I-beam 28 carrying bracket 29 supporting the fan. Pulley 30 mounted on shaft 31 in bracket 32 serves for driving the fan.

The operation of the apparatus is clear from the foregoing. The material is predried upon the plate 5, shoveled through opening 24 on plate grinder 17 over the heating chamber 2 where it is subjected to comminution and aeration. To remove the charge of finished products, hood 23 may be detached or the material may be removed through door 24. With the proper proportions and temperatures, no inconvenient sintering or fusion occurs, the mass remaining "dry" and easily ground throughout and the finished material is delivered as a powdery product, readily handled.

I find in making manganates a temperature of 400° to 550° C. at the grinding surfaces is desirable; this temperature with most mixtures giving me a "dry" mass which absorbs oxygen freely and is readily handled. The temperature away from the grinding surfaces may be considerably lower but it is usually desirable that the material be hot enough to prevent absorption of much moisture from the air as this would make it pasty and inconvenient to handle.

What I claim is:—

1. An oxidizing apparatus for simultaneously comminuting, rabbling and oxidizing solid materials, comprising a furnace chamber, an oxidizing chamber mounted thereabove and having a substantially flat and smooth floor or hearth heated by said furnace chamber and forming one part of grinding means, a grinding and stirring element mounted in said oxidizing chamber and adapted to traverse said floor or hearth to grind the material thereon, and means for imparting motion to said grinding and stirring element.

2. An oxidizing apparatus for simultaneously comminuting, rabbling and oxidizing solid materials, comprising a furnace chamber, an oxidizing chamber mounted thereabove and having a substantially flat and smooth floor or hearth heated by said furnace chamber and forming one part of grinding means, a grinding roll mounted in said oxidizing chamber and adapted to traverse said floor or hearth to grind the material thereon, and means for imparting motion to said grinding roll.

3. An oxidizing apparatus for simultaneously comminuting, rabbling and oxidizing solid materials, comprising a furnace chamber, a flat plate mounted on said furnace chamber and heated thereby, an inclosing casing for said plate, grinding rolls mounted within the casing and adapted to traverse said plate to grind the material thereon and means for imparting motion to said rolls.

4. In an oxidizing apparatus for oxidizing solids at high temperatures, a furnace-heated plate, another furnace-heated plate adjacent thereto in substance receiving relationship, grinding and stirring means mounted above the second plate and adapted to traverse the surface thereof, means for imparting motion to said grinding and stirring means to grind the solids on said heated plate, and a casing inclosing said grinding and stirring means.

In testimony whereof, I affix my signature hereto.

JOHN R. MacMILLAN.